Sept. 22, 1964  G. PETROSSIAN  3,150,334
CONSTANT PHASE SHIFT FARADAY ROTATOR
Filed April 12, 1961  2 Sheets-Sheet 1
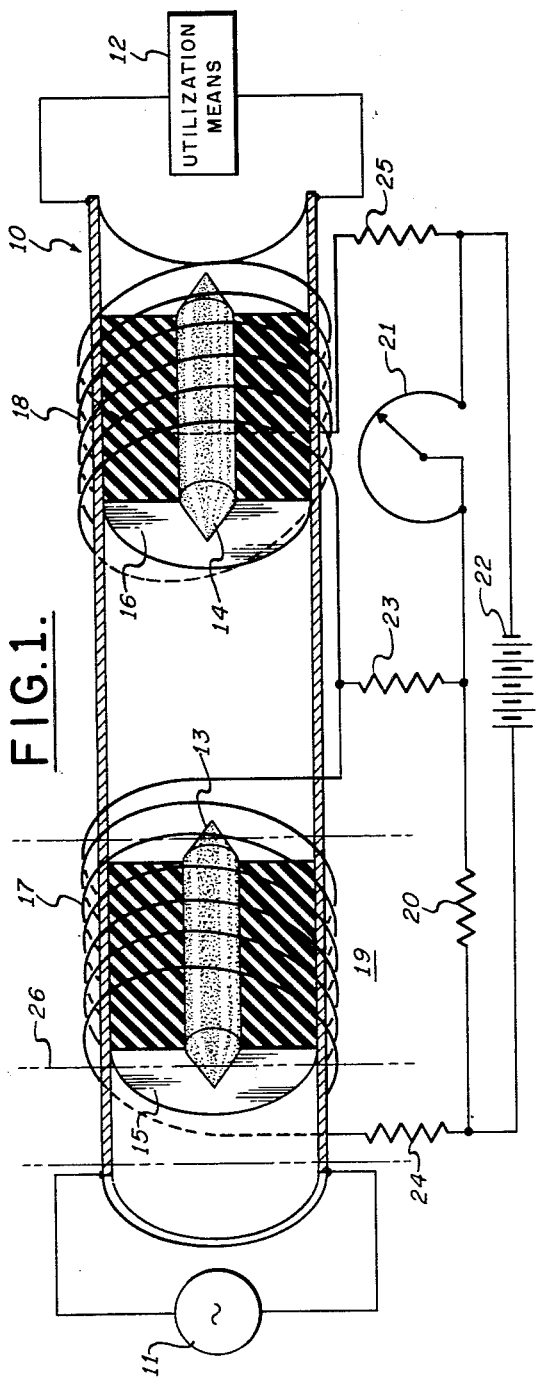
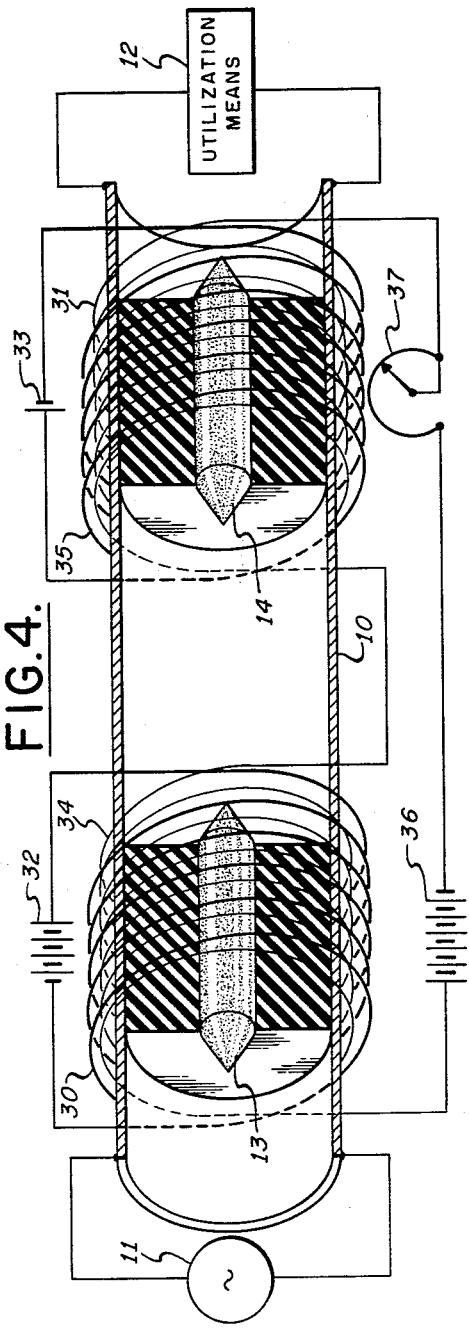
INVENTOR.
GEORGE PETROSSIAN
BY
ATTORNEY

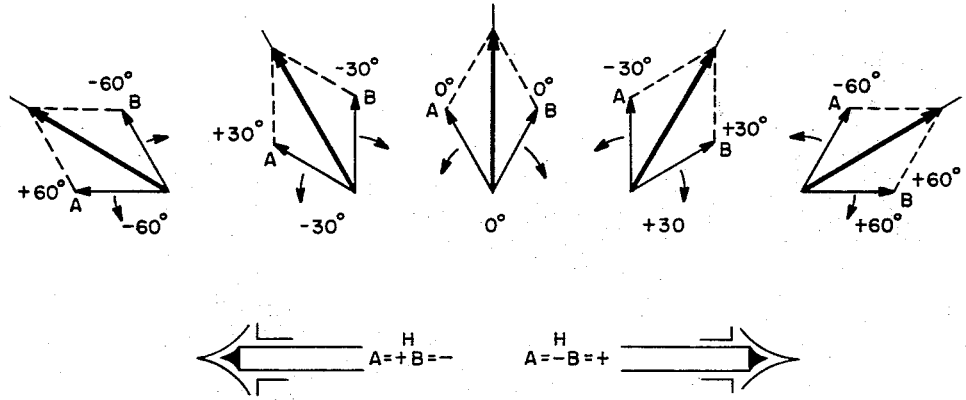
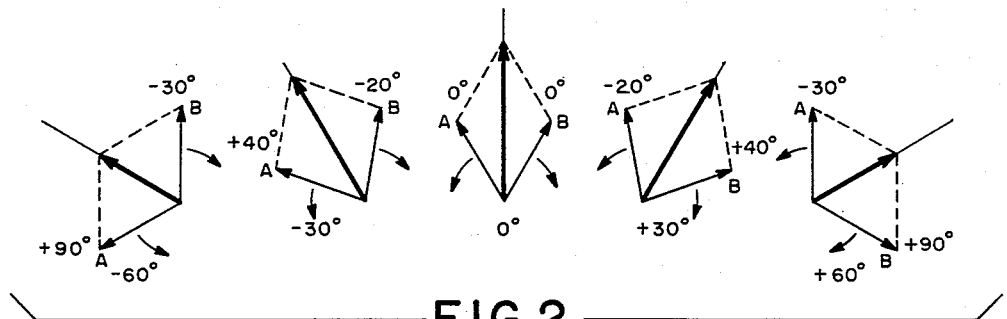
FIG.2.
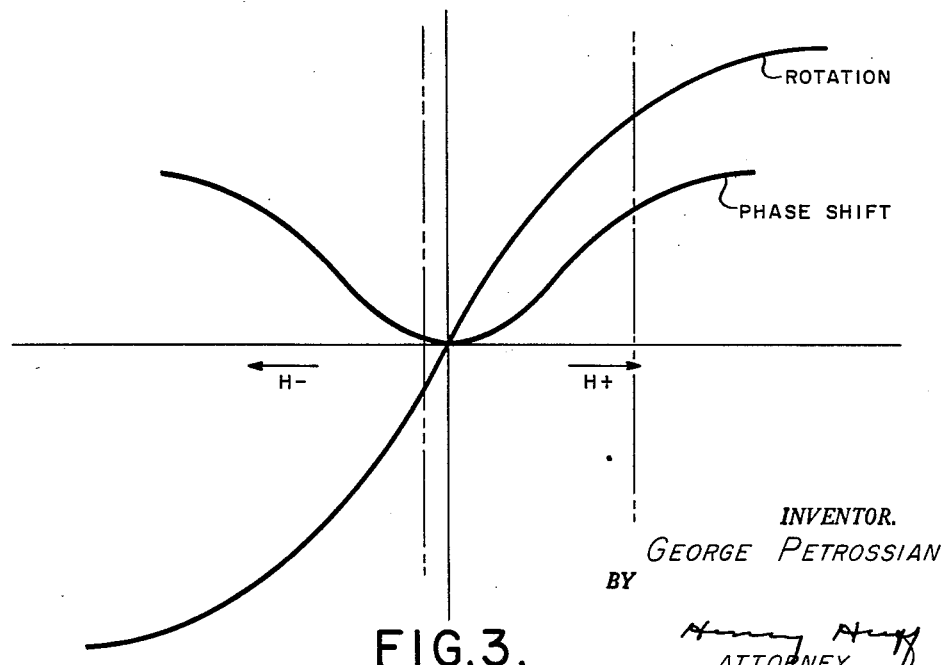
FIG.3.
INVENTOR.
GEORGE PETROSSIAN
BY
ATTORNEY

United States Patent Office 3,150,334
Patented Sept. 22, 1964

3,150,334
CONSTANT PHASE SHIFT FARADAY ROTATOR
George Petrossian, Forest Hills, N.Y., assignor to Sperry Rand Corporation, Great Neck, N.Y., a corporation of Delaware
Filed Apr. 12, 1961, Ser. No. 102,601
9 Claims. (Cl. 333—24.3)

This invention relates to electromagnetic wave polarization devices and, more specifically, it concerns an improved Faraday rotator.

Rotation of linearly polarized electromagnetic wave energy according to the Faraday effect involves the selective control of the velocity of propagation, for a finite distance, of each of the two oppositely rotating circularly polarized components of the wave. This results in a relative phase displacement between the two components which remains fixed as long as they both thereafter propagate at a common velocity. The vector sum of the phase displaced components is a linearly polarized wave rotated from the original wave.

The selective velocity control is accomplished by passing the electromagnetic wave through a magnetically biased gyromagnetic medium. Such a medium has tensor components of permittivity or permeability which are arranged in such a manner that the oppositely rotating circularly polarized components propagate through the medium with velocities which differ from each other by an amount dependent upon the strength of the magnetic bias. Thus by control of the magnetic bias any desired amount of rotation may be achieved.

Devices employing the Faraday rotation principle find wide use in the microwave field. Such devices are used, for example, in variable attenuators, switches, modulators and variable couplers. The simplicity, ease of control and R.F. shielding inherent in these devices accounts for their general acceptance over their more complicated and expensive mechanical counterparts.

A major difficulty is encountered however, when most presently known gyromagnetic substances are used with Faraday rotation devices at microwave frequencies. This disadvantage resides in the fact that changes in the magnetic field bias do not affect the velocities of propagation of the oppositely rotating components by equal and opposite amounts. For this reason, changes in phase shift, proportional to corresponding changes in rotation, are experienced by waves propagating through the device. As a consequence, when the device is used as a variable coupler or variable attenuator, a change in phase shift is produced each time the coupling or attenuation is changed.

The use of a polarization sensitive phase shifter, such as a slab of dielectic properly oriented with respect to the gyromagnetic substance, will compensate the phase shift problem to a certain degree. However, the extent of compensation is limited by the fact that the linearity of the wave is also affected. Furthermore the addition of such a compensating element decreases the amount of rotation possible per unit length of the device.

Consequently, it is an object of this invention to provide a Faraday rotation device wherein no change in phase shift is produced for different amounts of rotation.

It is another object to provide such a device wherein the linearity of incident electromagnetic energy is preserved for all degrees of rotation.

It is a further object to provide such a device producing the same amount of rotation per unit length as conventional Faraday rotation devices.

These and other objects of the invention will become more apparent as its preferred embodiments are described.

In general, the invention accomplishes its purposes by the provision of two gyromagnetic substances displaced from each other along a transmission line. Each substance is provided with an initial magnetic bias along the path of propagation of electromagnetic energy within the line. Means are provided to concurrently vary the magnetic bias in each substance in such manner that the algebraic sum of the changes in phase experienced by the contra-rotating components of the electromagnetic wave energy propagating through the line remains zero.

In order to avoid complexity in coordinating the magnetic biasing means, the preferred embodiment utilizes gyromagnetic media having substantially identical lengths and electrical characteristics. In this embodiment each medium is magnetically biased in an opposite direction to a point from which phase shift varies linearly with magnetic bias. Equal and unidirectional changes in magnetic bias are then provided in order to produce additive rotation and a subtractive phase shift.

Referring now to the figures:

FIG. 1 is a schematic (partially in section) of a preferred embodiment of the invention;

FIG. 2 is a diagrammatical representation of voltage magnitudes and directions upon a given cross sectional plane through the embodiment of FIG. 1;

FIG. 3 is a diagram illustrative of certain characteristics of a typical gyromagnetic medium used in the present device; and FIG. 4 is a schematic of an alternate embodiment of the invention.

The preferred embodiment shown in FIG. 1 is seen to consist of a length of cylindrical waveguide 10, located between a microwave signal generating means 11, and a utilization means 12. Two gyromagnetic media, 13 and 14, are disposed within the waveguide along its axis, and are supported by dielectric inserts 15 and 16. Solenoidal coils 17 and 18 are wound around the waveguide at the location of each of the gyromagnetic media respectively. The coils are serially connected in separate arms of one branch of a resistance bridge circuit 19. The other branch of the circuit comprises a fixed resistance 20 in one arm and a variable resistance such as a rheostat 21 in the remaining arm. A source of voltage 22 is applied at the junctions of the two branches and a fixed resistance 23 connects their midpoints. The coils have equal numbers of turns but are wound in opposite directions. Thus a current flowing through both coils produces opposing axial magnetic fields within the device. Proper operation of the circuit requires equal resistance values in each of the coil arms of the bridge. Resistance elements 24 and 25 located in these arms are adjusted in accordance with this requirement.

The gyromagnetic media may be any of several materials presently known in the microwave art to produce Faraday rotation. These materials include solids, such as ferrites and garnets, as well as ionized gases known as plasmas. The essential characteristic of these materials is their high magnetic anisotropy. More specifically, these materials when magnetically biased in a given direction exhibit a permeability or permittivity having tensor components which may be represented by a skew-symmetric matrix. In the case of ferrites for example, the spinning electrons in the material readily align their spin axes along the direction of the magnetic bias. These electrons will react to magnetic fields perpendicular to a magnetic bias in the same manner as a spinning gyroscope reacts to forces perpendicular to its spin axis. The resulting precessional motion of these electrons produces magnetic flux having magnitude and direction related to the magnetic field according to general gyroscopic equations. This relationship between the applied magnetic field and induced magnetic flux is described by the tensor permeability of the material, which because of the gyroscopic relationships has its components arranged in the form of a skew-symmetric matrix. The significance of the peculiar form of tensor permeability or permittivity taken by these materials lies in the fact that circularly polarized microwave energy will propagate through them at a velocity dependent both upon the magnitude of the external magnetic bias and upon the direction of rotation of the energy.

The dielectric inserts 15 and 16 which support the gyromagnetic media may be of any solid material such as Teflon. Their dielectric properties also enable them to concentrate microwave energy within each of the gyromagnetic media as well as to reduce reflections in this area of the waveguide.

The magnetic biasing circuit comprising the resistance bridge 19, the rheostat 21, the coils 17 and 18, and the voltage source 22 is arranged to produce initial magnetic flux in each of the gyromagnetic media in opposite directions and of different magnitudes. As the resistance of the rheostat 21 is decreased, a decrease in current will be experienced by the second coil 18 while an equal magnitude of increase in current will be experienced by the first coil 17. Thus it can be seen by adjustment of the rheostat, the magnetic flux in each medium will be changed by an equal amount in the same direction.

The operation of the device may be more fully explained by a prior consideration of the Faraday effect upon microwave energy. Referring first to FIG. 1, a linearly polarized wave propagating along the axis of the waveguide 10, may be considered as the vector sum of two oppositely rotating circularly polarized waves. As the linearly polarized wave intercepts an imaginary plane transverse to the axis, the voltage values of the two circularly polarized waves or components appear on the plane as two vectors extending radially from the axis and rotating about the axis in opposite directions at rates dependent upon the velocity of propagation of the respective components. The sum of these vectors, which is the voltage vector of the linearly polarized wave, appears as a sinusoidally varying magnitude located along a line which bisects the angle between the two rotating component vectors. The phase of the linear wave at a given time is seen to be dependent upon the angle between the component vectors at that time.

Referring now to FIG. 2, the upper diagrams show the relative positions of a linearly polarized wave voltage vector and oppositely rotating circularly polarized component vectors for various degrees of rotation and at a constant phase. It can be seen from FIG. 2 that in order to maintain a constant phase, i.e., a constant angle between the component vectors for varying degrees of rotation, the component vectors must be rotated by equal amounts in the same absolute direction. The amount and direction by which a component is rotated depends upon the velocity of propagation, the distance propagated at this velocity and the sense of polarization of the component. In the present case the components propagate through the same length of material but with opposite senses of polarization. Therefore, to fulfill the criteria of constant phase shift for varying degrees of rotation it is necessary that the respective velocities of propagation be changed by equal amounts in opposite directions.

In most gyromagnetic media however, changes in magnetic bias do not affect the veocity of propagation of oppositely rotating circularly polarized components by equal amounts in opposite directions. Thus as shown in the lower diagrams of FIG. 2, for comparable degrees of rotation, the positive change in one component is greater than the negative change in the other component. This results in a greater angle between the two components which in turn represents a change in phase shift undergone by the linearly polarized vector sum.

The amount of phase shift undergone by a wave propagating through such a gyromagnetic medium is proportional to the amount by which the velocity changes produced upon the two components differ from being equal in magnitude and opposite in direction. More directly, the phase shift is proportional to the algebraic sum of the velocity changes produced upon the components in the medium.

The present invention as shown in FIG. 1 compensates for this change in phase shift by providing a second gyromagnetic material beyond the first gyromagnetic medium and in the path of the propagating wave. The second material is magnetically biased in such a manner that the algebraic sum of the velocity changes on the two wave components passing through it is equal in magnitude and opposite in direction to that produced by the first medium.

In order to avoid a cancellation of rotation accompanying cancellation of phase shift it is necessary that the two media be magnetically biased to operate in regions where the algebraic sum of the changes in rotation undergone in each medium is of a finite value while the algebraic sum of the changes in phase shift is zero.

It can be seen from an examination of the diagrams of FIG. 2 that the rotation of the linear wave is dependent upon both the direction and the magnitude of the magnetic bias in a gyromagnetic medium while the phase shift is dependent only upon the magnitude of the bias. FIG. 3 shows a plot of rotation and phase shift undergone by a linearly polarized wave through a typical ferromagnetic medium for various magnitude and directions of magnetic bias. Although the quantitative nature of the plot depends upon the specific medium involved, its qualitative characteristics, which represent rotation as a function of both magnitude and direction of magnetic bias and phase shift as a function of magnitude only of the bias, as shown in FIG. 2 are independent of the specific gyromagnetic material. It can further be seen from FIG. 3 that by initially biasing one medium to a region where rotation and phase shift vary proportionally, and by biasing the second medium to a region where rotation and phase shift vary inversely a cumulative rotational effect and a compensative phase shift effect may be realized by changing each bias in the same absolute direction.

Where the same material or material having identical phase shift characteristics is used in each of the gyromagnetic locations of the device, and where each is biased to a linear region as indicated in FIG. 3, equal changes in the magnetic bias of each will produce the required phase shift compensation. The linear and symmetrical characteristics of most known gyromagnetic media make possible an accompanying linear rotation with respect to magnetic bias. Thus it is possible to employ a simple biasing circuit as shown in FIG. 1, which effects equal changes in the magnetic bias of each medium in the same absolute direction.

The biasing circuit shown in FIG. 1 is controlled by adjustment of the rheostat 21 which varies the resistance in one arm of the bridge circuit 19. When the rheostat is adjusted to a resistance value equal to that of the fixed resistor 20, the voltage value at the midpoint of this branch will be equal to one-half of the total voltage applied across the circuit. Since the resistance values of the coil arms in the branch are equal to each other, the voltage at the midpoint of this branch is also equal to one-half of the total applied voltage. Thus no current will flow through the resistor 23 which connects the midpoint of the two branches, and equal currents will flow through the two coil arms causing equal and opposite values of axial magnetic flux in the two gyromagnetic media.

When the rheostat 21 is adjusted to a resistance value less than that of the resistor 20, the voltage value at the midpoint of this branch will decrease. The resulting voltage difference at the midpoints of the branches causes a current to flow through the bridge resistor 23. This results in an increase in the magnitude of current through the first coil 17, and a corresponding decrease in the magnitude of current through the second coil 18. An analysis of the circuit discloses that increases in current through one coil are always equal to their correpsonding decreases in current in the other coil. Since the coils have equal numbers of turns in opposite directions, the resulting changes in magnetic flux through the coils will be of equal magnitude and in the same direction. Adjustment of the rheostat 21 to a resistance value greater than that of the resistor 20 produces an opposite effect.

An alternate embodiment, showing a second means for providing the necessary magnetic bias, is given in Fig. 4. In this embodiment the two functions of providing initial magnetic bias and of providing magnetic bias adjustment are provided by independent circuits. The initial bias in each gyromagnetic medium is produced by coils 30 and 35, each supplied with curent from fixed voltage supplies 32 and 33. The direction and magnitude of the voltage sources and the number and direction of the turns in each coil are chosen to produce the required magnetic bias in each medium. The adjusting circuit comprises two coils 31 and 34 superimposed respectively on the initial bias coils 30 and 35. The adjusting coils are wound in the same direction and are serially connected with an adjustable resistance element 37 and a voltage source 36. By adjustment of the resistance 37, the amount of current flowing through each of the coils may be controlled and equal unidirectional changes in magnetic bias of the gyromagnetic media will be produced.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A Faraday rotation device comprising means for directing the propagation of linearly polarized microwave energy under various degrees of rotation along a prescribed axis, first and second substantially identical gyromagnetic media mutually displaced along said axis, each of said media having discrete values of permeability and permittivity, one of said values in each medium having orthogonal tensor components represented by a skew-symmetric matrix wherein the velocities of propagation of oppositely rotating circularly polarized components of microwave energy propagating through said medium change with respect to an axial magnetic bias according to predetermined functions depending upon their sense of rotation, means for maintaining an oppositely directed axial magnetic bias in each of said media, said biasing means being adjusted to bias each gyromagnetic medium to a level where the rates of change of phase shift with change in bias are substantially equal and opposite, and interdependent current adjusting means for increasing the magnetic bias in one medium while simultaneously decreasing the magnetic bias in the other medium by the same absolute magnitude.

2. A Faraday rotation device comprising means for directing the propagation of linearly polarized microwave energy under various dagrees of rotation along a prescribed axis, first and second gyromagnetic media mutually displaced along said axis, each of said media having discrete values of permeability and permittivity, one of said values in each medium having orthogonal tensor components represented by a skew-symmetric matrix wherein the velocities of propagation of oppositely rotating circularly polarized components of microwave energy propagating through said medium change with respect to an axial magnetic bias according to predetermined functions depending upon their sense of rotation, means for initially magnetically biasing said media in opposite directions along said axis, said biasing means being adjusted to bias each gyromagnetic medium to a level where the rates of change of phase shift with change in bias are substantially equal and opposite, and interdependent current adjusting means for increasing the magnetic bias in one medium while simultaneously decreasing the magnetic bias in the other medium by the same absolute magnitude.

3. The device as described in claim 2 wherein each of said gyromagnetic media have identical electrical characteristics and are substantially identical in size and composition.

4. The device described in claim 3 wherein said magnetic biasing means include first and second solenoidal coils associated respectively with each of said gyromagnetic media, said coils being serially connected with a source of voltage, said coils being wound and connected to produce axial flux in opposite directions in said media said coils having equal resistance values and equal numbers of turns.

5. The device as decribed in claim 4 further including a fixed resistance connected in parallel with one of said coils and a variable resistance connected in parallel with with the other coil.

6. The device described in claim 2 wherein said magnetic biasing means comprises first and second solenoidal coils associated respectively with each of said gyromagnetic media, said coils conducting fixed values of electric current, and wherein said means for increasing and decreasing the magnetic bias comprises third and fourth solenoidal coils coaxial with and proximate to said first and second coils respectively, said third and fourth coils being serially connected with a source of voltage, and means for varying the current through said coils, said coils being wound and connected to produce equal and unidirectional values of magnetic flux.

7. A reduced phase shift polarization rotating apparatus comprising means for directing plane polarized microwave energy along an axis, first and second gyromagnetic elements which produce the Faraday rotation effect at microwave frequencies, gyromagnetic biasing means arranged to maintain axial magnetic fields in opposite axial directions in each gyromagnetic element, and interdependent means for increasing the magnetizing force applied to one gyromagnetic element while simultaneously decreasing the magnetizing force applied to the other gyromagnetic element by the same absolute magnitude.

8. A constant phase shift polarization rotating apparatus comprising means for directing plane polarized microwave energy along an axis, first and second gyromagnetic elements tandemly displaced along said axis, each of said elements being productive of the Faraday effect wherein oppositely rotating circularly polarized electromagnetic wave components are propagated at discrete velocities which vary individually with changes in an applied magnetic bias, means for maintaining oppositely directed axial magnetic biasing in each element, and means for concurrently increasing the magnetic bias in one element and decreasing the magnetic bias in the other element according to such a relationship that oppositely rotating components of plane polarized electromagnetic microwave energy propagating along said axis undergo a net change in velocity in one of said elements which is equal in magnitude and opposite in direction to the net change in velocity produced upon said components by the other of said elements.

9. A constant phase shift polarization rotating apparatus comprising means for directing plane polarized microwave energy along an axis, first and second substantially identical gyromagnetic elements tandemly displaced along said axis, said elements being productive of the Faraday effect wherein oppositely rotating circularly polarized electromagnetic wave components are propagated at discrete velocities which vary with changes in an axially applied magnetic bias, means for magnetically biasing said elements in opposite directions along said axis to points from which the net velocity changes produced upon oppositely rotating circularly polarized electromagnetic wave components propagating along said axis are linearly related to magnetic bias changes, and means for simultaneously increasing the magnetic bias in one element while decreasing the bias in the second element an equal amount.

References Cited in the file of this patent

UNITED STATES PATENTS

| | | |
|---|---|---|
| 2,240,700 | Kemp | May 6, 1941 |
| 2,857,574 | Anderson | Oct. 21, 1958 |
| 3,023,384 | Bowers | Feb. 27, 1962 |
| 3,031,631 | Moran | Apr. 24, 1962 |

OTHER REFERENCES

Loss: "1955 IRE Convention Record, Part 8," pages 109–112.